(12) United States Patent
Kamolsuwan

(10) Patent No.: US 10,798,787 B2
(45) Date of Patent: Oct. 6, 2020

(54) PAPER COOKING UTENSIL FOR INDUCTION COOKERS

(71) Applicant: CONTINENTAL PACKAGING (THAILAND) CO., LTD., Bangkok (TH)

(72) Inventor: Manit Kamolsuwan, Bangkok (TH)

(73) Assignee: Continental Packaging (Thailand) Co., Ltd., Bangkok (TH)

(*) Notice: Subject to any disclaimer, the term of this patent is extended or adjusted under 35 U.S.C. 154(b) by 343 days.

(21) Appl. No.: 15/680,997

(22) Filed: Aug. 18, 2017

(65) Prior Publication Data

US 2018/0324904 A1 Nov. 8, 2018

(30) Foreign Application Priority Data

May 3, 2017 (TH) ................................ 1701002477

(51) Int. Cl.
*H05B 6/12* (2006.01)
*H05B 6/10* (2006.01)
*A47J 36/02* (2006.01)

(52) U.S. Cl.
CPC .............. *H05B 6/105* (2013.01); *A47J 36/02* (2013.01); *A47J 36/022* (2013.01); *H05B 6/12* (2013.01)

(58) Field of Classification Search
CPC ........ A47J 36/02; A47J 36/022; A47J 36/024; A47J 36/027; A47J 36/04; H05B 6/105; H05B 6/12

USPC ................ 219/621, 622, 634, 725, 730, 731
See application file for complete search history.

(56) References Cited

U.S. PATENT DOCUMENTS

2004/0144777 A1* 7/2004 Harano ................. A47J 36/027
219/730

FOREIGN PATENT DOCUMENTS

KR 20160053860 A * 5/2016

* cited by examiner

*Primary Examiner* — Hung D Nguyen
(74) *Attorney, Agent, or Firm* — Muncy, Geissler, Olds & Lowe, P.C.

(57) ABSTRACT

A paper cooking utensil includes a paper cooking utensil formed into a food containing part made of a paper sheet. The paper sheet is sealed by an adhesive to form into each of the side sections and a bottom section, with the upper edge of each of the side sections being a flange section acting as a lip for holding the paper cooking utensil. Each of the flange sections is foldably connected along a folded line which folds down outwardly, the central area of the bottom section being attached with an aluminum foil sheet having a geometric shape. The aluminum foil sheet is fixed to the top surface of the bottom section by applying an adhesive only on two edges of the opposite sides, and the aluminum foil sheet is porous and has a thickness range of 10-50 microns with an area of no less than 60 square centimeters.

4 Claims, 2 Drawing Sheets

PAPER COOKING UTENSIL FOR
INDUCTION COOKERS

FIELD OF THE INVENTION

Engineering relating to a paper cooking utensil for induction cookers

BACKGROUND OF THE INVENTION

The use of induction cookers for cooking has increased due to their maximum efficiency in turning electrical energy into thermal energy by means of generating a magnetic field. When an electromagnetic field generated from a coil runs through steel or magnetic metal on an induction cooker, it produces an eddy current which flows through a magnet, and generates heat on a cooking utensil. However, if the cooking utensil is not made of steel or metal with a magnetic field, heat induction will not occur. Therefore, in the past, the cooking utensils made of glass, aluminum, copper, or paper could not be used with the induction cooker.

Currently, disposable utensils that use paper as a raw material are generally available. They obviously cannot be used with the induction cooker because of their inability to induce heat from the generated magnetic field. Therefore, as an initial solution, materials that can induce heat such as a steel or stainless steel sheet is placed at the bottom of a paper pot. Such material can transfer heat to the food or anything contained in that paper utensil. Nevertheless, when considering the cost, manufacturing process, and practical use, it is impossible to attach a steel or stainless steel sheet to the paper as an integral unit.

Therefore, in order to facilitate the users and consumers, the present invention uses the metal that has a lower cost per unit and can be fixed to the paper utensil instead of steel or stainless steel. However, the material used in the present invention neither has a magnetic field nor induces a magnetic field to generate heat. Such material (e.g., aluminum) will induce heat in a different way than the electromagnetic field on the generally-used induction cookers.

Objectives of the Invention

The paper cooking utensil for induction cookers according to the invention comprises a paper cooking utensil formed into a food containing part made of a paper sheet having its whole internal surface coated with a clear film and folded into a geometric cooking utensil. The said paper sheet is sealed together with an adhesive agent to form into each of the side sections and a bottom section. The upper edge of each of the side sections is a flange section acting as a lip for holding the paper cooking utensil. Each of the flange sections is foldably connected together along a folded line which folds down outwardly. The central area of the bottom section is attached with an aluminum foil sheet having a geometric shape. The said aluminum foil sheet is fixed to the top surface of the bottom section by applying an adhesive agent only on two edges of the opposite sides. The aluminum foil sheet is porous, and has a thickness range of 10-50 microns and an area of no less than 60 square centimeters, unless the induction cooker is designed to accommodate a metal utensil with a bottom area of lower than 60 square centimeters.

It is an objective of the present invention to provide a disposable paper cooking utensil for induction cookers to replace the existing metal cooking utensils for induction cookers. The existing paper cooking utensils cannot be used with the induction cookers as no heat is generated within such paper cooking utensils. Therefore, the present invention is an improved paper cooking utensil because it has an aluminum foil sheet fixed to the top surface of the bottom section by applying an adhesive agent only on the two edges of the opposite sides. The thickness of the aluminum foil sheet ranges from 10-50 microns, with an area of no less than 60 square centimeters, unless the induction cooker is designed to accommodate a metal utensil with a bottom area of lower than 60 square centimeters. The said aluminum foil sheet will generate heat to liquid contained in the said paper cooking utensils.

DETAILED DESCRIPTION OF THE INVENTION

Figure 1:
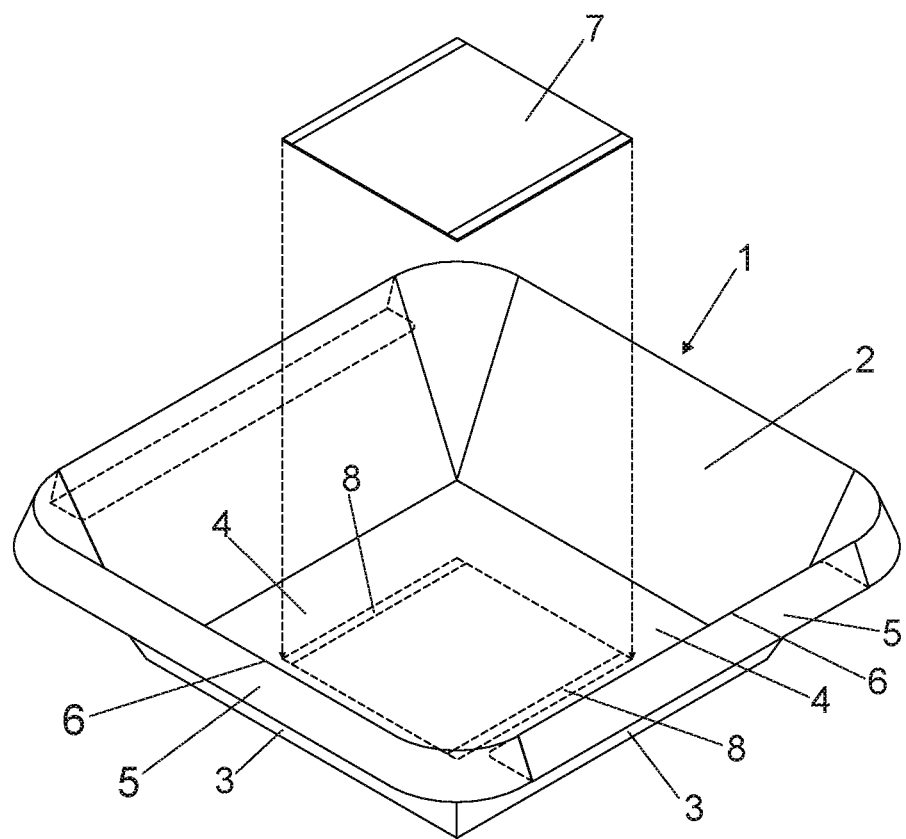
FIG. 1 is a three-dimensional exploded view of the paper cooking utensil for induction cookers according to the invention.
Figure 2:
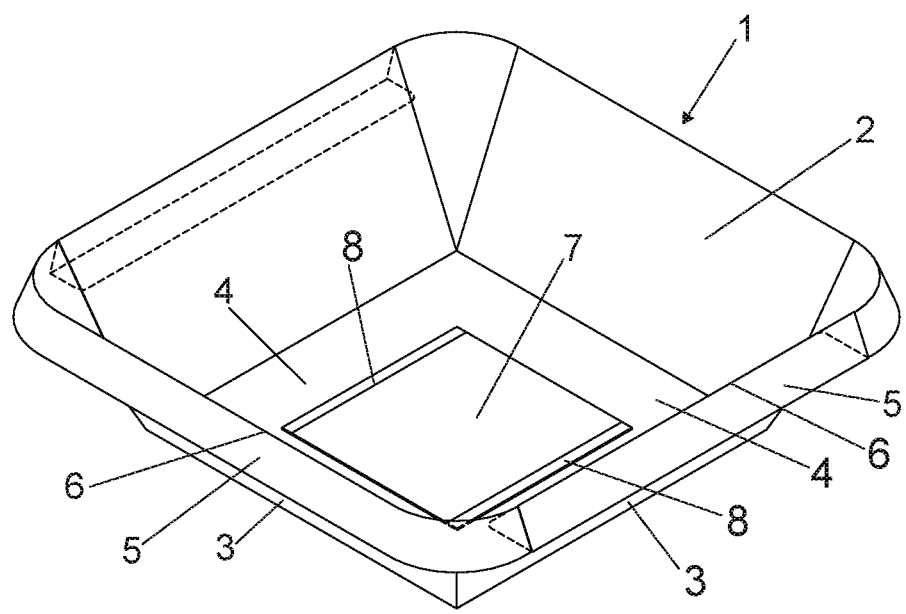
FIG. 2 is a three-dimensional view of the paper cooking utensil for induction cookers according to the invention.

FIGS. 1 and 2 show a paper cooking utensil for induction cookers according to the invention which comprises a paper cooking utensil (1) formed into a food containing part (2) made of a paper sheet having its whole internal surface coated with a clear film and folded into a geometric cooking utensil (as shown in the drawings as a square shape). The said paper sheet is sealed together with an adhesive agent to have each of the side sections (3) and a bottom section (4) formed into the food containing part (2). The upper edge of each of the side sections (3) is a flange section (5) acting as a lip for holding the paper cooking utensil (1). Each of the flange sections (5) is foldably connected together along a folded line (6) which folds down outwardly. The central area of the bottom section (4) is attached with an aluminum foil sheet (7) having a geometric shape (as seen in the drawings as a square shape). The said aluminum foil sheet (7) is fixed to the top surface of the bottom section (4) by applying an adhesive agent (8) only on two edges of the opposite sides. The aluminum foil sheet (7) is porous to allow liquid in the paper cooking utensil (1) to permeate through the surface of the aluminum foil sheet (7). The thickness of the aluminum foil sheet (7) ranges from 10-50 microns, with an area of no less than 60 square centimeters, unless the induction cooker is designed to accommodate a metal utensil with a bottom area of lower than 60 square centimeters. The dimension of the said aluminum foil sheet (7) is relative to the standard amount of the electromagnetic waves emitted by the induction cooker (not shown in the drawings).

Figure 3:
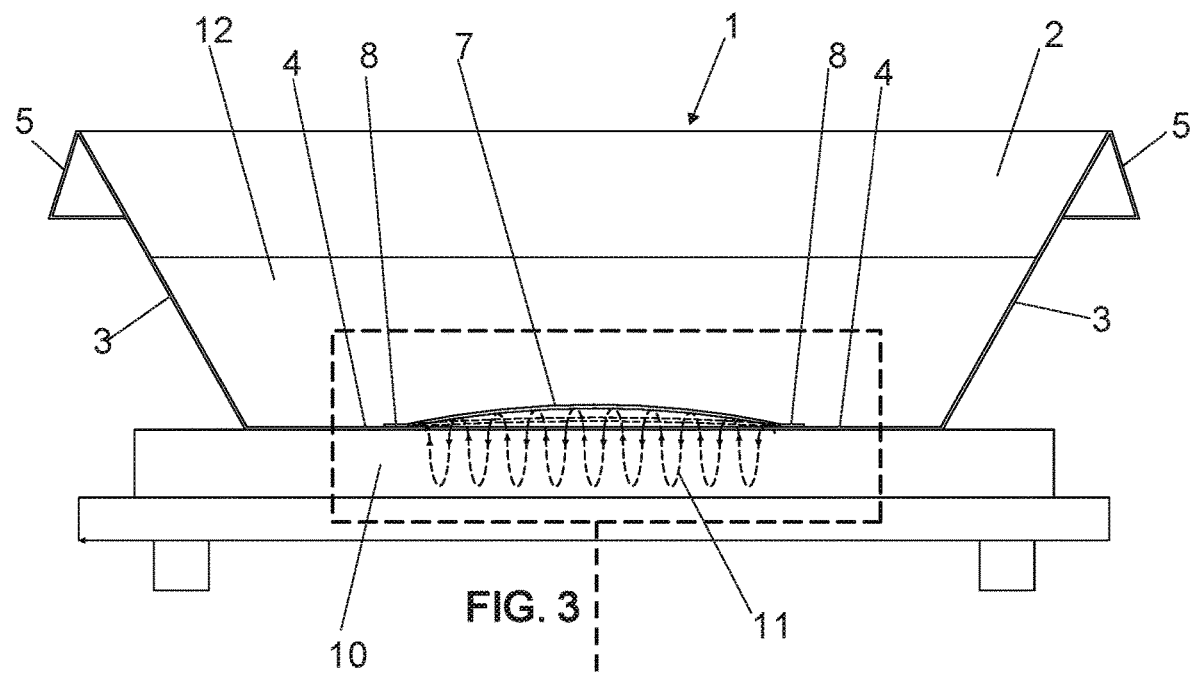
FIG. 3 shows the paper cooking utensil for induction cookers according to the invention on an induction cooker.
Figure 4:
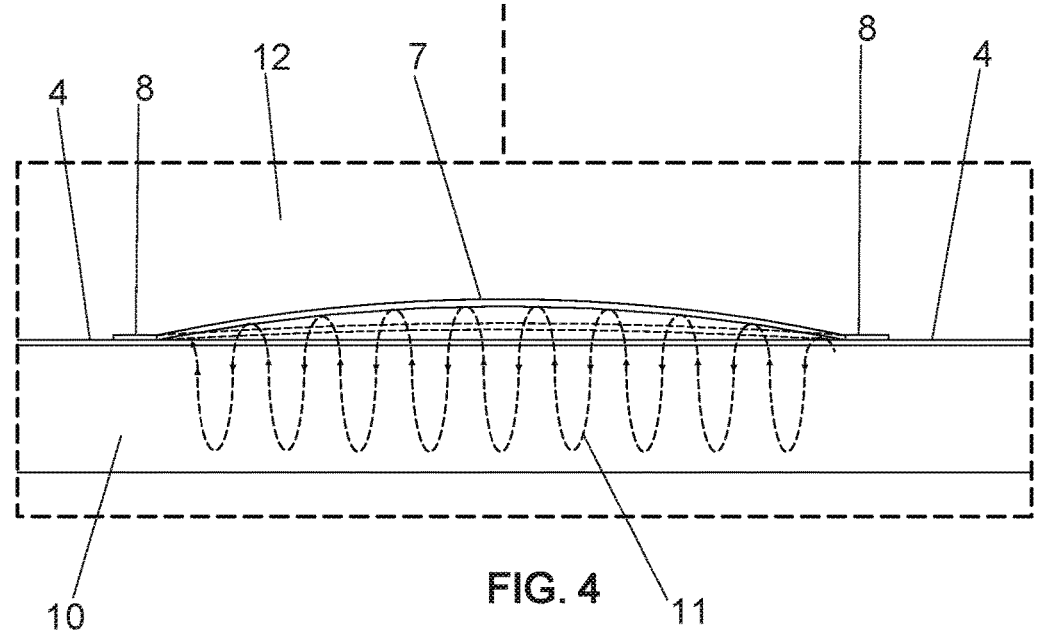
FIG. 4 is an enlarged partial view of FIG. 3.

FIGS. 3 and 4 show the paper cooking utensil for induction cookers according to the invention on an induction cooker (10) when cooking food. While the induction cooker (10) is emitting the electromagnetic waves (11), the aluminum foil sheet (7), which is fixed to the top surface of the bottom section (4) of the paper cooking utensil (1) by applying the adhesive agent (8) only on the two edges of the opposite sides, will vibrate upward and downward due to the attracting and repelling forces between the electromagnetic waves (11) emitted with the aluminum foil sheet (7). The said upward and downward vibration of the aluminum foil sheet (7) causes friction between the surface of the aluminum foil sheet (7) and liquid (12) inside the induction cooker (10), generating heat to liquid (12)

Apart from heat generated by the said upward and downward vibration of the aluminum foil sheet (7) on liquid (12), there is also some heat on the contact surface of the aluminum foil sheet (7) that is sealed with the adhesive agent (8). This is a result of the electromagnetic waves (11) emitted from the induction cooker (10) causing the electrons on the aluminum foil sheet (7) to move and produce heat on the surface of the aluminum foil sheet (7) which is electrically conductive. The said generated heat is caused by the loss of electrical energy due to the resistance of the aluminum foil sheet (7).

BEST MODE OF THE INVENTION

As described in the detailed description of the invention.

The invention claimed is:

1. A paper cooking utensil for an induction cooker, comprising:
    a food containing part made of a paper sheet having its whole internal surface coated with a clear film and folded into a geometric cooking utensil, wherein the paper sheet is sealed together with an adhesive agent to have each of side sections and a bottom section, and an upper edge of each of the side sections is a flange section acting as a lip for holding the paper cooking utensil, with each of the flange sections being foldably connected together along a folded line which folds down outwardly;
    an aluminum foil sheet having a geometric shape and being attached to a central area of the bottom section, wherein the aluminum foil sheet is fixed to a top surface of the bottom section by applying an adhesive agent only on two edges on opposite sides of the aluminum foil sheet, and the aluminum foil sheet is porous;
    wherein the thickness of the aluminum foil sheet ranges from 10-50 microns, with an area of no less than 60 square centimeters, and
    wherein the aluminum foil sheet is configured to vibrate upward and downward due to attracting and repelling forces between electromagnetic waves emitted from the induction cooker with the aluminum foil sheet.

2. The paper cooking utensil according to claim 1, wherein the bottom section of the food containing part is entirely flat and is connected to a bottom edge of side sections, and the bottom section is configured to fully contact a top surface of the induction cooker.

3. The paper cooking utensil according to claim 1, wherein the two edges on the opposite sides of the aluminum foil sheet are linear and parallel to each other.

4. The paper cooking utensil according to claim 1, wherein the two edges on the opposite sides of the aluminum foil sheet are spaced away from a closest edge of the bottom section of the food containing part.

* * * * *